United States Patent Office 3,068,549
Patented Dec. 18, 1962

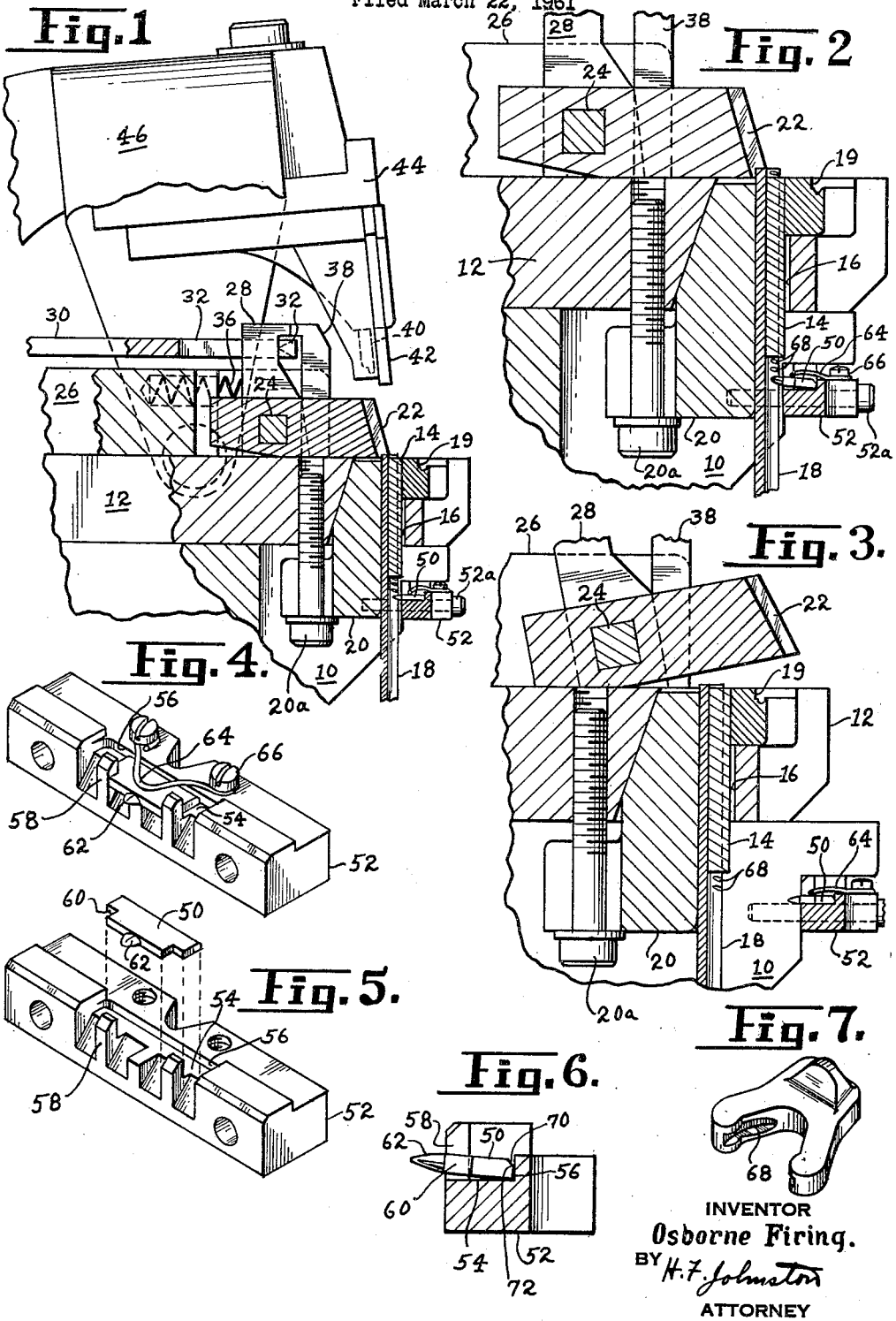

3,068,549
APPARATUS FOR MANUFACTURING ZIPPER FASTENER STRINGERS
Osborne Firing, Woodbury, Conn., assignor to Scovill Manufacturing Company, Waterbury, Conn., a corporation of Connecticut
Filed Mar. 22, 1961, Ser. No. 97,609
2 Claims. (Cl. 29—34)

This invention relates to an apparatus for manufacturing zipper fastener stringers and particularly to a machine for forming and shaping zipper fastener elements and attaching them continuously on a tape.

It has long been recognized that indentations or grooves in the jaws of zipper fastener elements would increase their gripping power on the tape, as indicated for example in Sundback Patent 1,937,297; this is particularly true in the smaller sizes of zippers.

The present invention is an improvement in a machine of the type shown in my Patent 2,962,921, whereby such grooves or indentations may be formed automatically without adding appreciably to the cost or speed of operation of such machine.

In the machine of my aforesaid patent, a continuous wire of Y-shaped section is fed upwardly through a slide which reciprocates back and forth and wherein the channel of the wire faces toward the front of the machine.

My present improvement requires only a small tool mounted forwardly of the wire path and carried by a stationary support, but in such a way that when the tool is engaged by the inner surfaces of the channel in the Y-sectioned wire during the forwardmost part of the slide travel, it may lift or angle slightly upwardly to accommodate the movement of the continuously feeding wire while the tool is engaged with the wire in forming the grooves. This tool must also be positioned accurately so that the grooves will be in the middle of the end section to be cut off to provide a fastener element blank and preferably this grooving tool is mounted as closely as possible to such cut-off point.

Other objects and advantages of my invention will hereinafter more fully appear.

In the accompanying drawing, I have illustrated only portions of a zipper fastener machine such as disclosed in the above referred-to patent, but enough to show how my groove-forming tool cooperates therewith to form grooves in the inner opposed surfaces of the legs of the fastener elements. In the drawing:

FIG. 1 is a partially sectionalized side view of the forward portion of my zipper fastener machine showing the position of the knife in its blank-cutting position with the fastener element stock advanced about half the thickness of a fastener element above the cut-off blade;

FIG. 2 is a similar view of the cutting and forming part of the machine on a larger scale, but showing the wire stock advanced the full width of a fastener element and grooved, ready to be cut off;

FIG. 3 is a view similar to FIG. 2 but showing the slide in its retracted position and the wire stock cleared of the groove-forming tool;

FIG. 4 is a perspective view of the groove-forming tool and its holder, connected together as a unit as it appears detached from the machine;

FIG. 5 is a similar view showing the holder and blade in a separated state;

FIG. 6 is a cross-sectional view of the hold bar and a full end view of the groove-forming tool on a larger scale, showing the tool in its angled position; and, FIG. 7 is a perspective view of a fastener element with grooved legs such as produced on my machine.

The machine here disclosed shows a portion of a slide housing 10 within which is slidably mounted a main slide 12, carrying a shearing or cut-off blade 14 mounted adjacent a vertical hole 16 in said slide 12 through which the wire stock 18 is fed upwardly. The slide 12 also carries a forming die 19 in which the blanks sheared from the wire stock are subsequently formed to provide the usual projection and socket in the head of the blank. The cut-off blade 14 and the forming die 19 are removably held within the slide 12 by a wedge block 20 secured to said slide by screws 20a.

The means for continuously feeding the wire stock 18 upwardly through the opening 16 is fully disclosed in the aforementioned patent. When the wire stock 18 is advanced its proper distance, which would be the full thickness of a fastener blank above the cut-off blade 14, the slide 12 is moved to the left underneath a shearing knife 22 mounted on a shaft 24 as viewed in FIG. 3. The shaft 24 is journaled in a cover plate 26 that is removably secured to the housing 10 to hold the slide 12 in place.

As the wire stock 18 moves under the knife 22 after the shearing operation, it is necessary to move the knife out of the path of the advancing stock 18. For that purpose, a pair of upwardly extending arms 28 are secured to the shaft 24 on opposite sides of the knife 22 and are operated by a reciprocating connecting link 30. The forward end of the link 30 is formed with a T-shaped yoke 32 that straddles the knife 22 and has opposed projections 32a engaging in suitable notches in the arms 28. The link 30 may be operated as described in the aforementioned patent for the purpose of elevating the forward end of the shearing knife 22 and clearing the advancing end of the stock 18. When the link 30 is returned to starting position, the arms 28 and the knife 22 are returned to their normal position by springs 36 compressesd between said arms 28 and adjacent end of the cover plate 26. The arms 28 are brought to a positive stop by a pair of stop blocks 38 mounted on the front end of the cover plate 26.

After the blank has been sheared off the end of the advancing stock 18, it will remain stationary until the die 19 moves under it. In this position, the die 19 will be in line with a forming punch 40 and a hold-down finger 42 that will engage the sheared element and hold it in the die during the punch-forming operation. The punch 40 and finger 42 are carried by a holder 44 secured to a pivot yoke 46 and operated by a connecting rod and eccentric (not shown).

The description of the machine up to this point is the same as described in my aforementioned patent and the novel improvement for providing grooves in the inner surfaces of the element legs will now be described.

For this purpose, a grooving tool or blade 50 and a blade support bar 52 are provided as best shown in FIGS. 4 and 5. The support bar 52 is attached to the forward end of the slide housing 10 by screws 52a. Specifically, the grooving tool 50 is supported in a recess 54 provided in the upper surface of the bar 52 and confined against lateral movement by the back wall 56 of the recess 54 and a pair of upward projections 58 engage in notches 60 in the edge of the blade 50. The blade 50 is formed with a relatively small projection 62 that extends forwardly of the outer edge of the blade so as to project beyond the supporting bar 52 when the blade is at rest in the recess 54. The projection 62 is shaped to form the desired grooves in the traveling wire stock 18.

To permit the blade 50 to move with the traveling wire stock 18, it is arranged so that it can pivot against the back wall of the recess 54. For this purpose, the blade 50 is tensionally held in its recess 54 by a yoke spring 64 tensioned against the upper surface of said blade, and the spring 64 is attached to the upper surface of the bar 52 by cap screws 66.

In the operation of the apparatus, as the slide 12 is advanced toward its foremost position, the channeled surface of the Y-shaped wire stock 18 will be forced against the projection 62 of the tool 50 and cause a pair of opposed grooves or notches 68 to be impressed in said channeled surface for each forward stroke of said slide. It will be noted that during the grooving or notching operation, the wire stock 18 will be firmly backed up in line with the tool 50 by the wedge block 20 as seen in FIGS. 2 and 3. Because the wire is constantly advancing, the blade 50 due to its hinging action, will be angled upwardly by the traveling stock 18 against the tension of the yoke spring 64. To facilitate the hinging action of the blade 50, the upper outer edge of said blade is beveled as at 70, thus providing a fulcrum 72 adapted to bear against the back wall 56 of the support bar 52.

When the slide 12 recedes, the wire stock 18 will be withdrawn from the blade 50 thus permitting the blade to spring back to its normal horizontal position in the support bar 52. As the machine continues in operation, a series of these notches 68 will be provided in the channeled surface of the wire stock 18 between the notching position of the blade 50 and the point where an element is cut off above the cut-off blade 14.

It will thus be apparent that my invention provides a simple and economical means of forming the desired indentations or grooves in the fastener element legs, in a machine of the type indicated.

What I claim is:

1. In a machine for making slide fastener stringers having a horizontal slide with a vertical hole adapted for the passage of a Y-sectioned continuous wire with the channel of the Y section facing toward the front of the machine, means for continuously feeding said wire at a uniform rate through said hole in said slide, a shearing knife mounted above said slide in the path of the end of said wire for shearing blanks from the wire when the latter is moved by said slide under the shearing knife, and means for reciprocating said slide backwardly and forwardly; the improvement which consists of a rearwardly directed grooving tool forwardly of the path of said wire, means for supporting said tool against back and forth movement while permitting limited up and down movement, said tool being so positioned that it engages the inner surfaces of the channel in said Y-sectioned wire during the forward portion of the slide travel to form grooves in such surfaces.

2. In a machine for making slide fastener stringers having a horizontal slide with a vertical hole adapted for the passage of a Y-sectioned continuous wire with the channel of the Y section facing toward the front of the machine, means for continuously feeding said wire at a uniform rate through said hole in said slide, a shearing knife mounted above said slide in the path of the end of said wire for shearing blanks from the wire when the latter is moved by said slide under the shearing knife, a cross shaft to which said knife is fixed, spring means normally holding said knife in shearing position against said slide, means for reciprocating said slide backwardly and forwardly, and means connected to said shaft and operated by said slide-reciprocating means for the intermittently moving of the same to lift said shearing knife out of the path of the advancing end of a wire after the cutting operation and during that period when said shearing knife is over the path of said advancing wire; the improvement which consists of a support bar fixed to the forward end of said machine underneath said slide, a blade carried by said bar, a notching projection on said blade in line with said wire adapted to form grooves on the inner surfaces of said Y-shape wire when said wire is forced against said projection at the end of the forward stroke of said slide, and means permitting said blade to hinge on said bar so that said projection can travel with the advancing wire while engaged thereby.

References Cited in the file of this patent

UNITED STATES PATENTS

| | | |
|---|---|---|
| 2,619,148 | Camp | Nov. 25, 1952 |
| 2,763,051 | Firing | Sept. 18, 1956 |